(12) United States Patent
Choi et al.

(10) Patent No.: US 11,711,028 B2
(45) Date of Patent: Jul. 25, 2023

(54) INVERTER CONTROL DEVICE AND METHOD

(71) Applicant: LS ELECTRIC CO., LTD., Anyang-si (KR)

(72) Inventors: Seung Cheol Choi, Anyang-si (KR); Hak Jun Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 17/440,533

(22) PCT Filed: Aug. 6, 2019

(86) PCT No.: PCT/KR2019/009778
§ 371 (c)(1),
(2) Date: Sep. 17, 2021

(87) PCT Pub. No.: WO2020/189861
PCT Pub. Date: Sep. 24, 2020

(65) Prior Publication Data
US 2022/0158569 A1    May 19, 2022

(30) Foreign Application Priority Data

Mar. 19, 2019  (KR) .................. 10-2019-0031015

(51) Int. Cl.
*H02M 7/5387* (2007.01)
*H02P 21/18* (2016.01)
*H02P 21/00* (2016.01)
*H02P 27/08* (2006.01)

(52) U.S. Cl.
CPC ...... *H02M 7/5387* (2013.01); *H02P 21/0003* (2013.01); *H02P 21/18* (2016.02); *H02P 27/08* (2013.01)

(58) Field of Classification Search
CPC .. H02P 21/00; H02P 21/0021; H02P 21/0085; H02P 21/04; H02P 21/09;
(Continued)

(56) References Cited

U.S. PATENT DOCUMENTS 8,076,896 B2 * 12/2011 Yamamoto ........ H02M 7/53875
318/400.07
2012/0038311 A1   2/2012 Villwock et al.

FOREIGN PATENT DOCUMENTS

| JP | 03036992 A | 2/1991 |
| JP | H06253576 A | 9/1994 |
| JP | 2015171302 A | 9/2015 |
| JP | 2016096688 A | 5/2016 |

(Continued)

OTHER PUBLICATIONS

International Search Report for related International Application No. PCT/KR2019/009778; action dated Sep. 24, 2020; (5 pages).

(Continued)

*Primary Examiner* — Antony M Paul
(74) *Attorney, Agent, or Firm* — K&L Gates LLP

(57) ABSTRACT

Disclosed are an inverter control device and method. The method according to an embodiment of the present includes estimating a rotation speed of a motor, determining a slip frequency reference using an energy of a direct current terminal capacitor of an inverter, which provides an output voltage to the motor, and a direct current terminal energy reference when a direct current terminal voltage of the inverter is a certain level or less, and providing a frequency reference determined by adding the rotation speed of the motor and the slip frequency reference to the inverter.

12 Claims, 8 Drawing Sheets

(58) Field of Classification Search
CPC .......... H02P 21/14; H02P 23/00; H02P 23/08;
H02P 23/14; H02P 23/30; H02P 21/20;
H02P 7/00; H02P 7/265; H02P 7/29;
H02P 7/292; H02P 6/00; H02P 6/06;
H02P 6/08; H02P 6/17; H02P 6/32; H02P
27/00; H02P 27/04; H02P 27/06; H02P
27/08; H02P 27/085; H02P 25/03; H02P
25/00; H02P 25/062; H02P 1/00; H02P
1/04; H02P 1/16; H02P 1/18; H02P 1/24;
H02P 1/26; H02P 1/30; H02P 1/42; H02P
1/46; H02P 1/426; H02P 3/00; H02P 3/24
See application file for complete search history.

(56) References Cited

FOREIGN PATENT DOCUMENTS

| KR | 20010067062 A | 7/2001 |
| KR | 20060064336 A | 6/2006 |
| KR | 20120077493 A | 7/2012 |
| KR | 101861986 B1 | 5/2018 |
| KR | 10-2020-0111394 A | 9/2020 |

OTHER PUBLICATIONS

Written Opinion for related International Application No. PCT/KR2019/009778; action dated Sep. 24, 2020; (4 pages).
Roberts; "Power Failure Ride Through for an Inverter System Using Its Own Induction Motor Load as Energy Source"; IEEE, vol. IGA-5, No. 5; Sep./Oct. 1969; (5 pages).

* cited by examiner

INVERTER CONTROL DEVICE AND METHOD

CROSS-REFERENCE TO RELATED APPLICATIONS

The present application is a National Stage of International Application No. PCT/KR2019/009778 filed on Aug. 6, 2019, which claims the benefit of Korean Patent Application No. 10-2019-0031015, filed on Mar. 19, 2019, with the Korean Intellectual Property Office, the entire contents of each hereby incorporated by reference.

FIELD

The present disclosure relates to an inverter control device and method.

BACKGROUND

In general, an inverter is an inverse conversion device which electrically converts a direct current (DC) to an alternating current (AC). An inverter used in industries is defined as a series of devices which receive a power supplied from a commercial power source, change a voltage and a frequency of the power therein, supply the changed power to the motor, and thereby perform control so that a motor speed may be used with high efficiency. The inverter is controlled using a variable voltage variable frequency (VVVF) method, and a voltage and a frequency input to the motor may be changed on the basis of a pulse width modulation (PWM) output.

FIG. 1 is a block diagram of a general inverter.

In general, an inverter 100 receives an AC power of three phases, a rectification unit 110 rectifies the AC power, and a smoothing unit 120 smooths and stores a DC voltage rectified by the rectification unit 110. An inverter unit 130 outputs the DC voltage stored in a DC link capacitor, which is the smoothing unit 120, as an AC voltage having a certain voltage and frequency according to a PWM control signal and provides the AC voltage to a motor.

The rectification unit 110 generally includes a diode which is a passive element. Since on/off control for the diode is not possible and it is not possible to control a DC terminal voltage stored in the smoothing unit 120, the DC terminal voltage of the smoothing unit 120 is determined by an AC input voltage. Also, the power flows in a single direction from the AC power source to the DC terminal voltage of the inverter 100, and thus a recovery operation is not possible. Accordingly, it is difficult for the conventional inverter 100 to perform an active operation according to the power and the state of load.

As described above, the inverter 100 which employs the rectification unit 110 including a diode cannot stably maintain the DC terminal voltage due to a voltage drop of the AC power source or a power failure, and thus the inverter cannot continuously operate. When it is difficult for the inverter to operate continuously, a considerable amount of time is required to operate the inverter 100 again.

SUMMARY

The present disclosure is directed to providing an inverter control device and method which allow a continuous inverter operation even while power supply to an inverter is not normal.

One aspect of the present disclosure provides an inverter control device including a first estimation unit configured to estimate a rotation speed of a motor, a first determination unit configured to determine a slip frequency reference using an energy of a direct current (DC) terminal capacitor of an inverter, which provides an output voltage to the motor, and a DC terminal energy reference when a DC terminal voltage of the inverter is a certain level or less, and a generation unit configured to provide a frequency reference determined by adding the rotation speed of the motor and the slip frequency reference to the inverter.

The first estimation unit may estimate the rotation speed of the motor using the output voltage of the inverter, an output current of the inverter, and a nominal value of the motor.

The first estimation unit may include a second determination unit configured to determine an output power using the output voltage and an output current of the inverter, a third determination unit configured to determine a load torque using the output power and an output frequency of the inverter, a second estimation unit configured to estimate a slip frequency using the load torque and a rated slip frequency and a rated torque of the inverter, and a third estimation unit configured to estimate the rotation speed of the motor using a difference between the slip frequency estimated by the second estimation unit and the output frequency of the inverter.

The first estimation unit may further include a low pass filter (LPF) configured to perform low-pass-filtering on the slip frequency estimated by the second estimation unit.

The first determination unit may include a fourth determination unit configured to determine a necessary energy from the energy of the DC terminal capacitor of the inverter and the DC terminal energy reference, a fifth determination unit configured to determine a power reference from the necessary energy, a sixth determination unit configured to determine a torque reference using the power reference and the rotation speed of the motor, and a seventh determination unit configured to determine the slip frequency reference using a torque constant in the torque reference.

The fifth determination unit may include a proportional controller.

The torque constant may be determined using a rated torque of the motor and a rated slip frequency of the motor.

The generation unit may determine a voltage reference from the frequency reference and provide the voltage reference to the inverter.

The inverter control device may further include a control unit configured to provide an operation flag to the first determination unit when the DC terminal voltage of the inverter is the certain level or less.

Another aspect of the present disclosure provides an inverter control method including estimating a rotation speed of a motor, determining a slip frequency reference using an energy of a DC terminal capacitor of an inverter, which provides an output voltage to the motor, and a DC terminal energy reference when a DC terminal voltage of the inverter is a certain level or less, and providing a frequency reference determined by adding the rotation speed of the motor and the slip frequency reference to the inverter.

The estimating of the rotation speed of the motor may include determining an output power using the output voltage and an output current of the inverter, determining a load torque using the output power and an output frequency of the inverter, estimating a slip frequency using the load torque and a rated slip frequency and a rated torque of the inverter, and estimating the rotation speed of the motor using a difference between the estimated slip frequency and the output frequency of the inverter The determining of the slip frequency reference may include determining a necessary energy from the energy of the DC terminal capacitor of the inverter and the DC terminal energy reference, determining a power reference from the necessary energy, determining a torque reference using the power reference and the rotation speed of the motor, and determining the slip frequency reference using a torque constant in the torque reference.

According to the above-described present disclosure, when a failure occurs in an input power, a recovery operation is performed to convert the mechanical energy of a motor into the electrical energy of an inverter. Accordingly, a direct current (DC) terminal voltage is kept constant such that the inverter can continuously operate without being stopped.

DETAILED DESCRIPTION

For sufficient understanding of configurations and effects of the present disclosure, exemplary embodiments of the present disclosure will be described with reference to the accompanying drawings. However, the present disclosure is not limited to the embodiments disclosed below. The present disclosure may be implemented in various forms, and various modifications may be made. Descriptions of the embodiments are provided only for making the disclosure of the disclosure thorough and for fully conveying the scope of the present disclosure to those skilled in the technical field to which the present disclosure pertains. In the accompanying drawings, for convenience of description, elements may be enlarged from actual size, and each element may be exaggerated or reduced in ratio.

Although the terms "first," "second," etc. may be used to describe various elements, these elements should not be limited by these terms. The terms may be only used to distinguish an element from another. For example, a "first element" may be named a "second element," and similarly, a "second element" may be named a "first element." Singular expressions include plural expressions unless the context clearly indicates otherwise. As used herein, terms may be interpreted to have meanings that are generally known to those of ordinary skill in the art unless defined otherwise.

Hereinafter, a conventional inverter control system will be described with reference to FIGS. 2 to 4, and an inverter control device and method according to an embodiment of the present disclosure will be described with reference to FIGS. 5 to 10.

Figure 1:
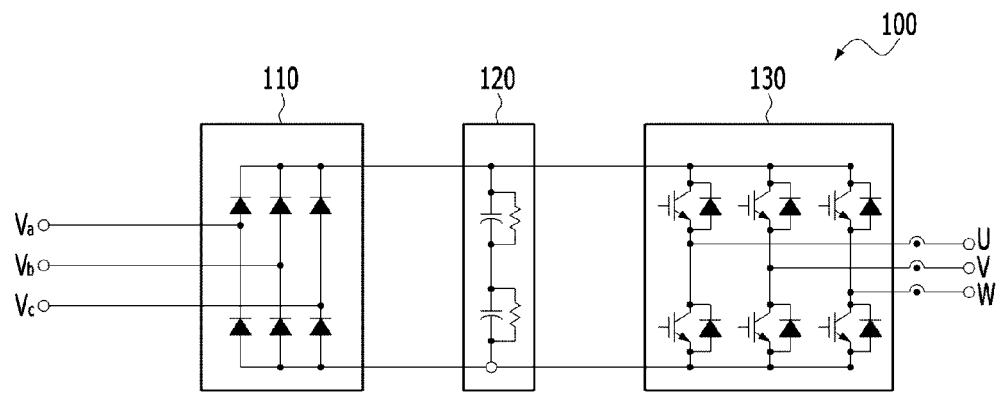
FIG. 1 is a block diagram of a general inverter.
Figure 2:
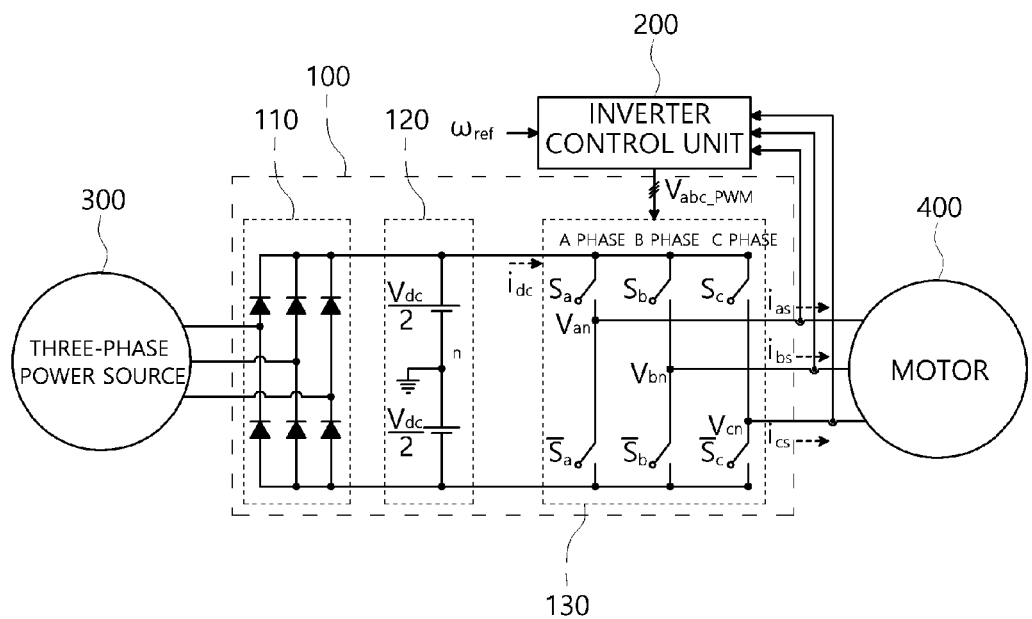
FIG. 2 is a block diagram for describing a conventional inverter control system.
Figure 3:
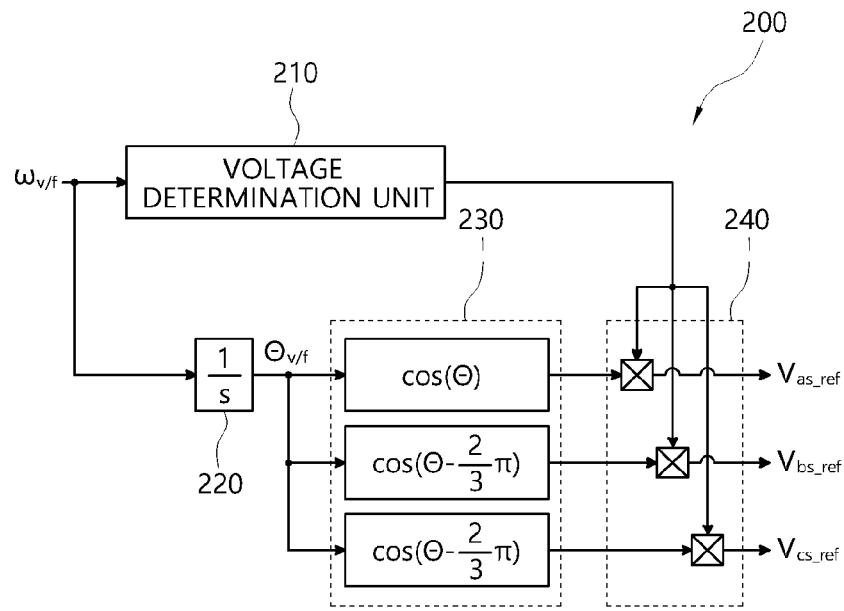
FIG. 3 is a detailed block diagram of an inverter control unit of FIG. 2.

FIG. 2 is a block diagram for describing a conventional inverter control system, and FIG. 3 is a detailed block diagram of an inverter control unit 200 of FIG. 2. When a user inputs a reference frequency $\omega_{ref}$, the inverter control unit 200 synthesizes a reference voltage corresponding to the reference frequency and outputs the reference voltage to an inverter unit 130.

In FIG. 3, the inverter control unit 200 includes a voltage determination unit 210, an integral unit 220, a phase determination unit 230, and an output unit 240.

The voltage determination unit 210 may determine a level of an output voltage $V_{v/f}$ from an inverter operation frequency $\omega_{v/f}$. The inverter operation frequency $\omega_{v/f}$ represents a voltage which starts with 0 and reaches the reference voltage $\omega_{ref}$. FIG. 4 is a graph for describing the relationship between an inverter operation frequency and an inverter output voltage.

When the inverter 100 initially operates, the inverter operation frequency $\omega_{v/f}$ increases from 0, and thus the inverter 100 outputs a low voltage. Along with an increase in frequency, the inverter 100 outputs a voltage having a level, which is proportionate to the frequency. When the output frequency reaches the reference frequency $\omega_{ref}$, the frequency does not increase any more, and the inverter 100 operates at a constant speed.

Figure 4:
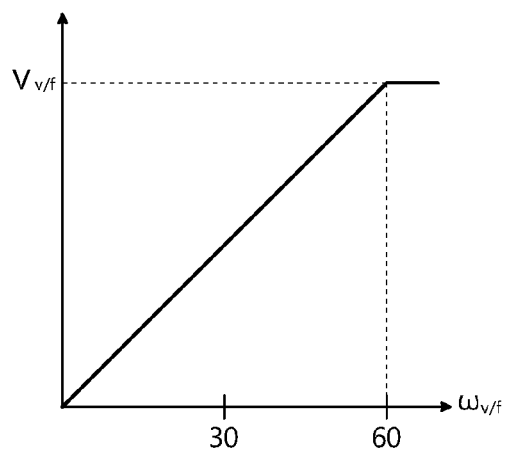
FIG. 4 is a graph for describing the relationship between an inverter operation frequency and an inverter output voltage.

In other words, the voltage determination unit 210 determines a level of the output voltage $V_{v/f}$ from the inverter operation frequency $\omega_{ref}$ according to the relationship of FIG. 4.

The integral unit 220 determines a phase $\theta_{v/f}$ of the output voltage by integrating the operation frequency $\omega_{v/f}$, and the phase determination unit 230 outputs a three-phase alternating current (AC) sine wave. The output unit 240 multiplies the AC sine wave and the output voltage together and outputs reference voltages $V_{as\_ref}$, $V_{bs\_ref}$, and $V_{cs\_ref}$.

In other words, the inverter control unit 200 combines three-phase pulse width modulation (PWM) voltages corresponding to the three-phase reference voltages and outputs a final reference voltage $V_{abc\_PWM}$. In FIG. 2, the inverter unit 130 of the inverter 100 supplies power to an induction motor 400 by outputting three-phase AC output voltages $V_{an}$, $V_{bn}$, and $V_{cn}$ from a direct current (DC) terminal voltage of a smoothing unit 120, and the three-phase AC output voltages are determined according to an on-state or off-state of the inverter unit 130. In the inverter unit 130, each phase includes two switches connected in series, and the phases operate independently from each other to generate output voltages. Here, the phases are controlled so that the output voltages may have a phase difference of 120 degrees from each other.

In the conventional inverter control system, the inverter 100 which receives AC power from a three-phase power source 300, which is an energy source, converts the AC power into DC power through a rectification unit 110. Here, the rectification unit 110 includes a diode, and a current always flows in one direction.

The smoothing unit 120 includes a capacitor, a battery, or the like and maintains a constant voltage. Three-phase switches of the inverter unit 130 convert a DC voltage into an AC voltage and control an output voltage of the inverter 100 through on or off thereof.

The motor 400 functions as a load of the three-phase inverter 100. The inverter control unit 200 determines a switching state of the inverter unit 130 so that the motor 400 may rotate at the same speed as a reference frequency.

In such a conventional inverter control system, the rectification unit 110 includes the diode, which is a passive element, and thus it is difficult to control the DC terminal voltage. Also, when the three-phase power source operates abnormally, such as exhibiting instantaneous interruption or voltage drop, the inverter 100 cannot operate continuously, and the DC terminal voltage is not controlled constantly such that a failure occurs in the inverter 100. Further, in some cases, a considerable time is required for the inverter 100 to operate again, which causes a great loss.

Therefore, a ride through operation, which is sustainable regardless of a power state, is required.

The present disclosure is intended to solve the above problems and provides an inverter control device, which receives electrical energy for an inverter from kinetic energy of a motor through a recovery operation and continuously operates the inverter and the motor even when the power supply is not normal.

In other words, in the case of a power failure, the control device of the present disclosure maintains the DC terminal power of an inverter using the kinetic energy of load inertia and thus performs a recovery operation through appropriate operation frequency adjustment. Accordingly, when inertia is greater and a load is smaller, the DC terminal power can be stably maintained for a longer time.

Figure 5:
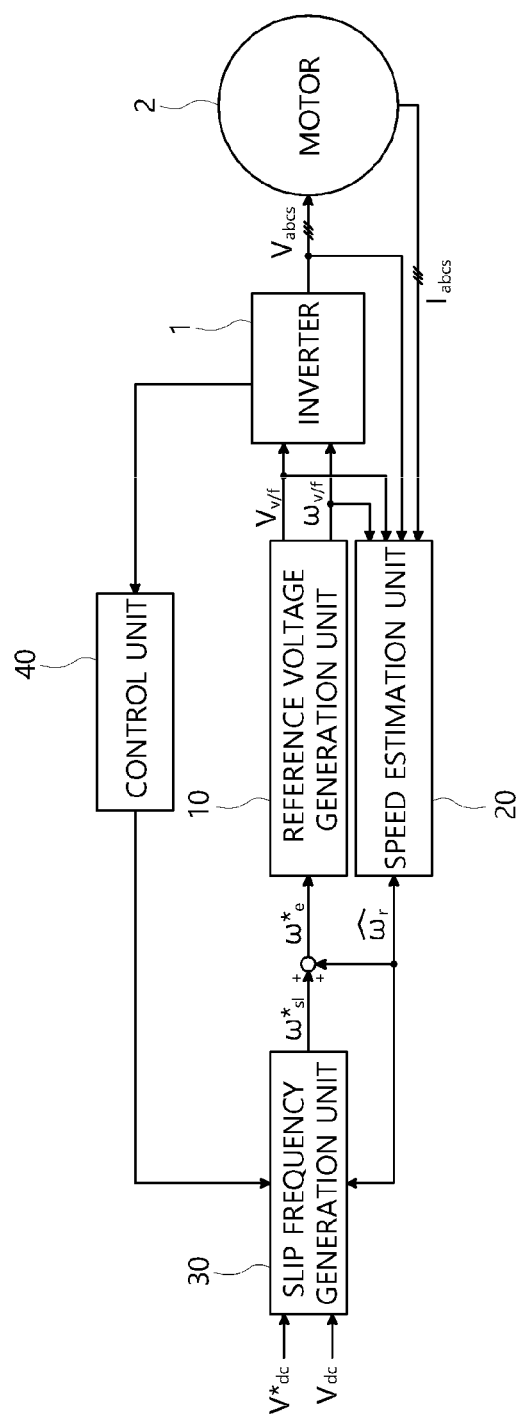
FIG. 5 is a block diagram of an inverter system according to an embodiment of the present disclosure.

FIG. 5 is a block diagram of an inverter system according to an embodiment of the present disclosure.

As shown in the drawing, an inverter control device according to the embodiment of the present disclosure may include a reference voltage generation unit 10 which supplies a reference voltage to an inverter 1, a speed estimation unit 20 which estimates a speed of the motor 2, a slip frequency generation unit 30, and a control unit 40.

The control unit 40 may check a DC terminal voltage of the inverter 1. When the DC terminal voltage becomes a certain level or less, the control unit 40 may transmit a flag for turning on operation of the slip frequency generation unit 30 to the slip frequency generation unit 30.

Figure 6:
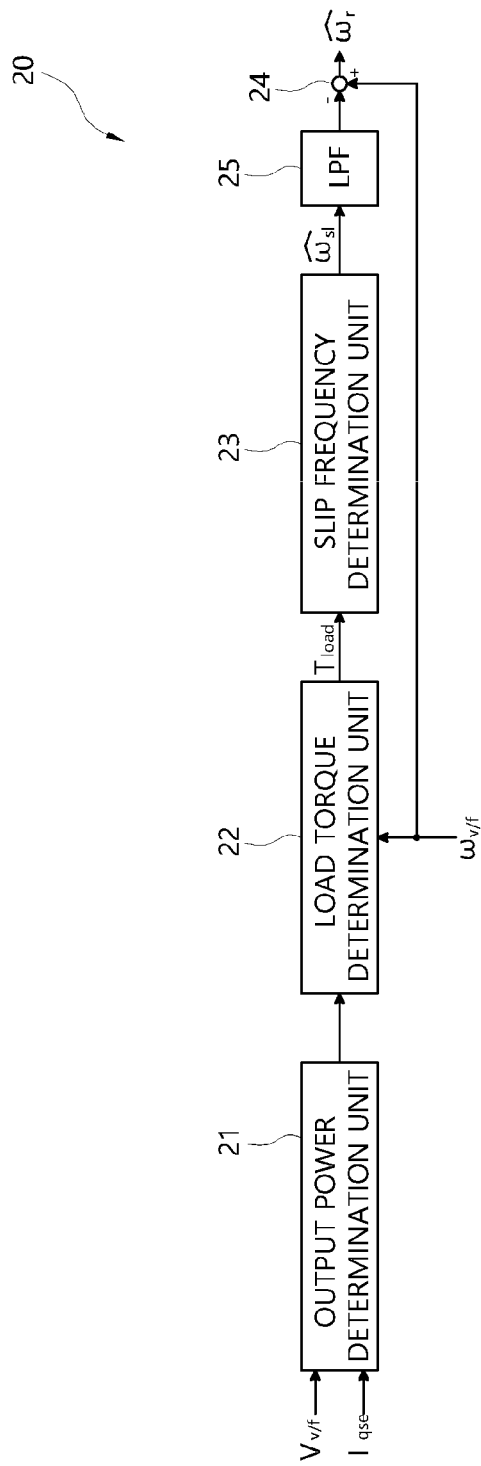
FIG. 6 is a detailed block diagram of an embodiment of a speed estimation unit of FIG. 5.

The speed estimation unit 20 may estimate the speed of a rotor of the motor 2. FIG. 6 is a detailed block diagram of an embodiment of the speed estimation unit 20 of FIG. 5. In a general voltage/frequency operation, open loop control is performed, and thus it is difficult to use speed information through a speed measurement device such as an encoder. Accordingly, the speed estimation unit 20 according to the embodiment of the present disclosure may estimate a rotation speed $\hat{\omega}_r$ of the motor 2 through an available inverter output voltage and current and a nominal value of the motor 2.

As shown in the drawing, the speed estimation unit 20 of the present disclosure may include an output power determination unit 21, a load torque determination unit 22, a slip frequency estimation unit 23, a speed determination unit 24, and a low pass filter (LPF) 25.

The output power determination unit 21 may determine an output power of the inverter 1 in consideration of an output voltage $V_{v/f}$ of the inverter 1, a synchronous reference frame q-axis current $I_{qse}$ based on a reference angle which is a torque-component output current of the inverter, and the number of poles.

Also, the load torque determination unit 22 may determine a load torque using the output voltage and an output frequency $\omega_{v/f}$ of the inverter 1.

The load torque output through the output power determination unit 21 and the load torque determination unit 22 is given by the following equation.

$$T_{load} = \frac{3}{2} \cdot \frac{Pole}{2} \cdot V_{v/f} \cdot I_{qse} / \omega_{v/f} \qquad \text{[Equation 1]}$$

The slip frequency estimation unit 23 may estimate a slip frequency using the load torque and a rated slip frequency and a rated torque of the inverter 1. The slip frequency estimated by the speed frequency estimation unit 23 is given by the following equation.

$$\hat{\omega}_{sl} = T_{load} \cdot \frac{\omega_{slip\_rated}}{T_{rated}} \qquad \text{[Equation 2]}$$

The speed determination unit 24 may estimate a speed of the motor 2 using a difference between the estimated slip frequency and the output frequency of the inverter 1. The estimated speed of the motor 2 is given by the following equation.

$$\hat{\omega}_r = \omega_{v/f} \hat{\omega}_{sl} \qquad \text{[Equation 3]}$$

Here, the LPF 25 may be disposed between an output terminal of the slip frequency estimation unit 23 and an input terminal of the speed determination unit 24 to perform low-pass-filtering, and a band to be filtered out may be determined in consideration of stabilization of the system.

In FIG. 5, when the DC terminal voltage is the certain level or less according to control of the control unit 40, the slip frequency generation unit 30 may compare a DC terminal voltage reference $\overline{V_{dc}}$ and an actual DC terminal voltage $\overline{V_{dc}}$ to determine a slip frequency for constantly maintaining the DC terminal voltage. In general, a slip frequency is a difference between an inverter output frequency and a motor speed. In the embodiment of the present disclosure, when the DC terminal voltage is the certain level or less, the slip frequency may be determined to be a negative value so that the motor speed may become greater than the inverter output frequency.

Figure 7:
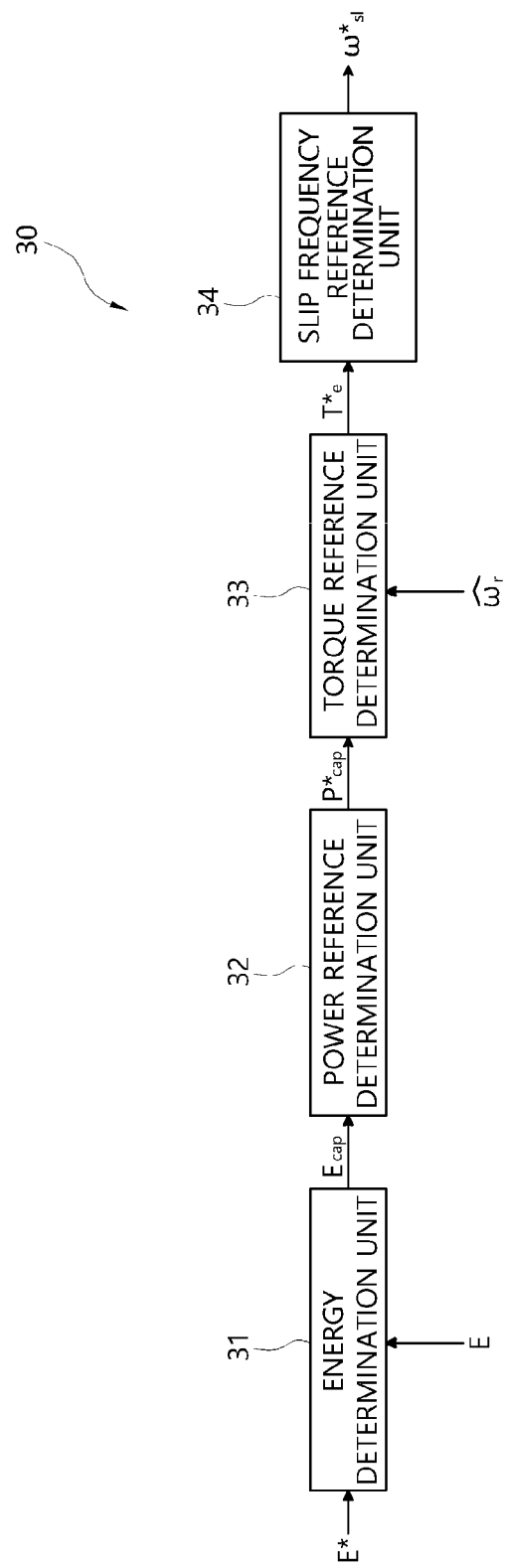
FIG. 7 is a detailed block diagram of an embodiment of a slip frequency generation unit of FIG. 5.

FIG. 7 is a detailed block diagram of an embodiment of a slip frequency generation unit of FIG. 5.

As shown in the drawing, the slip frequency generation unit 30 according to the embodiment of the present disclosure may include an energy determination unit 31, a power reference determination unit 32, a torque reference determination unit 33, and a slip frequency reference generation unit 34 and perform a recovery operation using a slip frequency.

The slip frequency may be calculated from a difference between a DC voltage reference and an electrical energy corresponding to an actual DC terminal voltage. When an energy of a DC terminal capacitor is E, a DC energy reference is E*, and a capacitor energy required for a recovery operation according to the embodiment of the present disclosure is $E_{cap}$, the energy of the DC terminal capacitor and the capacitor energy required for a recovery operation are given by the following equations, and the energy determination unit 31 may determine the capacitor energy required for a recovery operation according to Equation 5.

$$E = \frac{C_{dc}}{2} V_{dc}^2 \quad \text{[Equation 4]}$$

$$E_{cap} = E^* - E = \frac{C_{dc}}{2}(V_{dc}^{*2} - V_{dc}^2) \quad \text{[Equation 5]}$$

In the above equation, $C_{cap}$ denotes the capacitance of the DC terminal capacitor, and $\overline{V^*_{dc}}$ denotes the DC terminal voltage reference.

Meanwhile, a power of the DC terminal capacitor is given by the following equation.

$$P_{cap} = \frac{C_{dc}}{2} \frac{dV_{dc}^2}{dt} \quad \text{[Equation 6]}$$

The power reference determination unit 32 may receive the capacitor energy required for a recovery operation and determine a power reference $P^*_{cap}$. The power reference determination unit 32 may be, for example, a proportional controller having a proportional control gain of $K_p$.

In general, a proportional controller measures an output of a target to be controlled, calculates an error by comparing the output with a desired reference value or a set value, and calculates a control value required for control using the error value, thereby performing a control operation, which is proportionate to the error value in a current state. However, this is exemplary, and it is self-evident to those skilled in the technical field to which the present disclosure pertains that the power reference determination unit 32 may be another controller.

The torque reference determination unit 33 may determine a torque reference using the speed estimated by the speed estimation unit 20.

The relationship among a rated torque, a speed, and a force of a motor is given as follows.

$$T_{rated} = \frac{\text{Pole}}{2} \frac{P_{rated}}{\omega_{rated}} \quad \text{[Equation 7]}$$

Here, $T_{rated}$ denotes a rated torque of the motor 2, Pole denotes the number of poles, $P_{rated}$ denotes a rated power of the motor 2, and $\omega_{rated}$ denotes a rated speed of the motor 2. Therefore, the torque reference determination unit 33 may determine a torque reference using Equation 7 above.

The slip frequency reference determination unit 34 may calculate a slip frequency using a torque constant R. The relationship between a torque and a slip frequency is as follows.

$$K_t = \omega_{sl\_rated} / T_{rated} \quad \text{[Equation 8]}$$

In other words, the slip frequency reference determination unit 34 may determine a slip frequency reference using the torque reference and the torque constant according to the above relational expression. Here, $T_{rated}$ denotes the rated torque of the motor 2, and $\omega_{sl\_rated}$ denotes a rated slip frequency of the motor 2.

In FIG. 5, the slip frequency reference output from the slip frequency generation unit 30 is added to the estimated speed of the motor 2 output from the speed estimation unit 20 and input to the reference voltage generation unit 10.

The reference voltage generation unit 10 is intended to control an output voltage of the inverter 1. The reference voltage generation unit 10 may determine the output voltage and an operation frequency of the inverter 1 and provide a resultant voltage to the inverter 1.

The reference voltage generation unit 10 performs the same function as the inverter control unit 200 of FIG. 2. An operation of the reference voltage generation unit 10 and an operation of the inverter 1 are the same as described above with reference to FIG. 2, and thus detailed descriptions thereof will be omitted.

Figure 8:
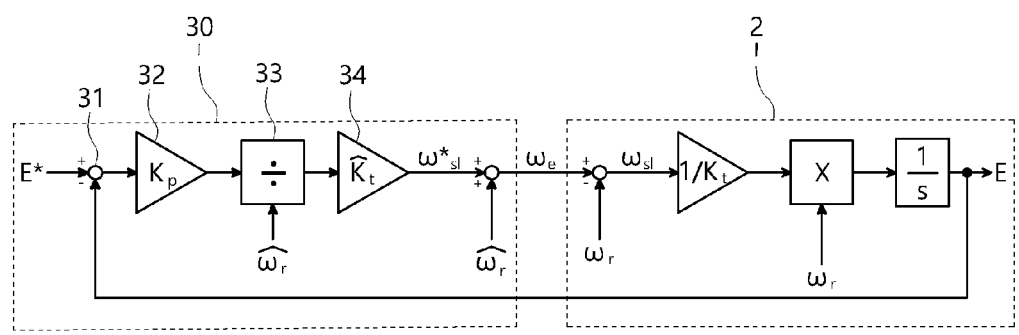
FIG. 8 is a block diagram for describing a control relationship between a motor and a slip frequency generation unit in FIG. 5.

FIG. 8 is a block diagram for describing a control relationship between the motor 2 and the slip frequency generation unit 30 in FIG. 5. Here, the block diagram of the motor 2 is approximated using Equation 7 and Equation 8.

A transfer function in the control configuration of FIG. 8 is given by the following equation.

$$E = \frac{K_p \frac{\omega_r \cdot \hat{K}_t}{\omega_r \cdot K_t}}{s + K_p \frac{\omega_r \cdot \hat{K}_t}{\hat{\omega}_r \cdot K_t}} \cdot E^* + \frac{\frac{\omega_r}{K_p}}{s + K_p \frac{\omega_r \cdot \hat{K}_t}{\hat{\omega}_r \cdot K_t}} \cdot (\hat{\omega}_r - \omega_r) \quad \text{[Equation 9]}$$

Here, $K_p$ denotes a gain of the proportional controller which is the power reference determination unit 32, and $\hat{\omega}_r$ and $\hat{K}_t$ denote a calculated speed and torque constant of the motor, respectively. $\hat{\omega}_r$ denotes determined by the speed estimation unit 20 of FIG. 5.

When the speed and the torque constant are accurately estimated, Equation 9 may be represented by Equation 10.

$$\frac{E}{E^*} = \frac{K_p}{s + K_p} \quad \text{[Equation 10]}$$

In other words, the transfer function of the slip frequency generation unit 30 may be represented as a first-order LPF according to Equation 10, and a bandwidth may be selected with the gain of the proportional controller, which is the power reference determination unit 32.

The control unit 40 according to the embodiment of the present disclosure may continuously check the DC terminal voltage. When the DC terminal voltage becomes the certain level or less, the control unit 40 may provide a flag for turning on the slip frequency generation unit 30 and thereby perform control so that the kinetic energy of the motor 2 may be backed up as shown in FIG. 8.

Figure 9:
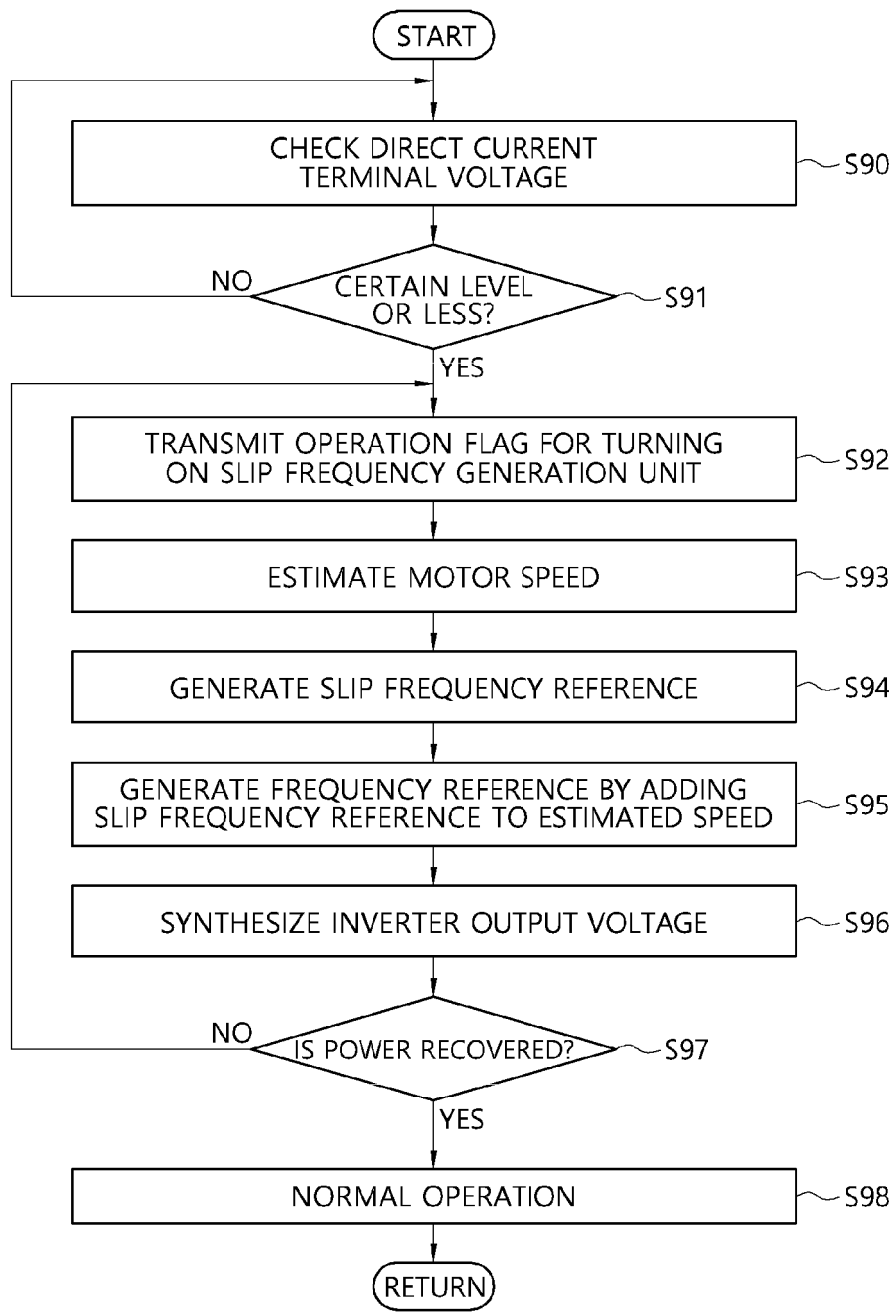
FIG. 9 is an exemplary diagram for describing an inverter control method according to an embodiment of the present disclosure.
Figure 10:
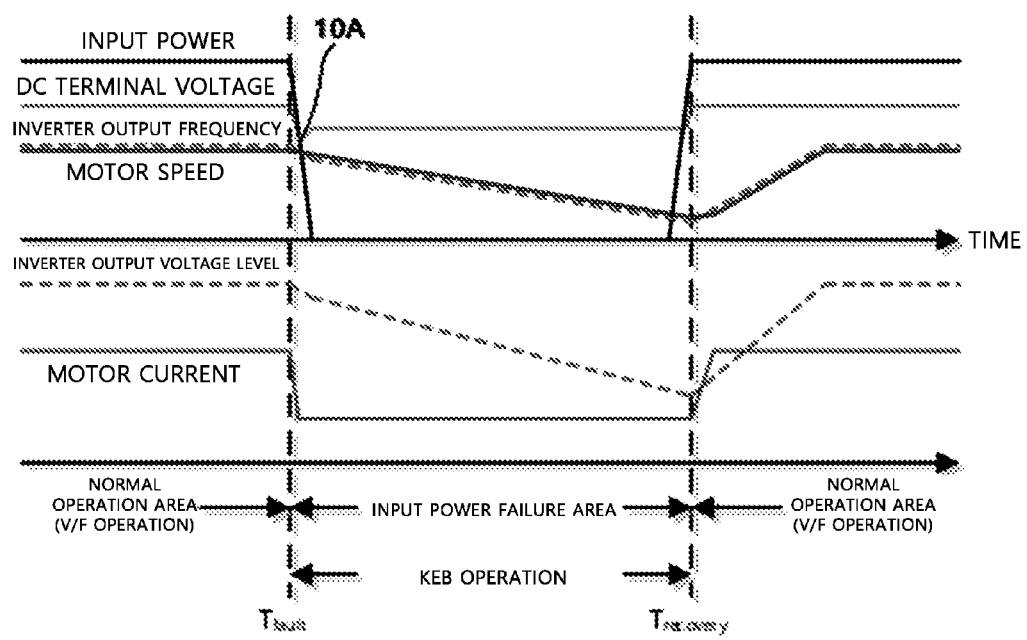
FIG. 10 is an exemplary diagram for describing a voltage-current relationship resulting from a control operation according to an embodiment of the present disclosure.

FIG. 9 is an exemplary diagram for describing an inverter control method according to an embodiment of the present disclosure, and FIG. 10 is an exemplary diagram for describing a voltage-current relationship resulting from a control operation according to an embodiment of the present disclosure.

As shown in the drawing, in the control method according to the embodiment of the present disclosure, the control unit 40 may continuously check a DC terminal voltage of the inverter 1 (S90) and determine whether the DC terminal voltage of the inverter 1 becomes a certain level or less (S91). When a failure occurs in an input power, the DC terminal voltage is reduced due to the input power.

A DC voltage level for the control unit 40 of the present disclosure to transmit an operation flag to the slip frequency generation unit 30 may be determined by an operator's setting.

When the control unit 40 determines that the DC terminal voltage is the certain level or less, the control unit 40 may transmit the operation flag for turning on operation of the slip frequency generation unit 30. In FIG. 10, while the input power is normal and the DC terminal voltage is maintained at a certain level, the DC terminal voltage may become a certain reference level (10A) or less. In this case, the control unit 40 may transmit the operation flag for turning on the operation of the slip frequency generation unit 30 to the slip frequency generation unit 30. Here, the reference level (10A) may be, for example, 200 V when a commercial power of 220 V is used.

Even in this case, the speed estimation unit 20 may continuously operate to estimate a rotation speed of a rotor of the motor 2.

Subsequently, when the speed estimation unit 20 estimates the speed of the motor 2, the slip frequency generation unit 30 may generate a slip frequency reference using the energy of the DC terminal voltage.

Subsequently, a frequency reference may be generated by adding a slip frequency to the estimated speed (S95), and the reference voltage generation unit 10 may generate an output voltage of the inverter corresponding to the frequency reference and provide the output voltage to the inverter 1 (S96).

Referring to FIG. 10, when the DC terminal voltage is less than the reference level (10A), the frequency reference is generated by adding the slip frequency reference to the estimated speed of the motor 2. Here, an inverter output frequency is output at a speed lower than the motor speed, and the level of the output voltage may be determined from the relationship between the voltage and the frequency. In other words, the output frequency of the inverter 1 may be output at a lower speed than the speed of the motor 2, and the DC terminal voltage of the inverter 1 may be maintained at a constant level.

Subsequently, when the DC terminal voltage is recovered to a certain level $T_{recovery}$ (S97), the control unit 40 may transmit an operation flag for turning off the slip frequency generation unit 30 to the slip frequency generation unit 30 and perform control for a normal operation (S98). Referring to FIG. 10, the control unit 40 may perform control such that, when the power is recovered, the inverter output frequency may rise from the inverter output frequency to a speed before the failure.

As described above, according to the present disclosure, when a failure occurs in an input power, a recovery operation of converting the mechanical energy of a motor into the electrical energy of an inverter is performed. Accordingly, a DC terminal voltage is kept constant such that the inverter can continuously operate without being stopped.

Although embodiments of the present disclosure have been described above, the embodiments are merely exemplary, and those of ordinary skill in the art should appreciate that various modifications or equivalents can be made therefrom. Therefore, the true technical scope of the present disclosure should be determined by the following claims.

What is claimed is:

1. An inverter control device comprising:
    a first estimation unit configured to estimate a rotation speed of a motor;
    a first determination unit configured to determine a slip frequency reference using an energy of a direct current terminal capacitor of an inverter, which provides an output voltage to the motor, and a direct current terminal energy reference when a direct current terminal voltage of the inverter is a certain level or less; and
    a generation unit configured to provide a frequency reference determined by adding the rotation speed of the motor and the slip frequency reference to the inverter.

2. The inverter control device of claim 1, wherein the first estimation unit estimates the rotation speed of the motor using the output voltage of the inverter, an output current of the inverter, and a nominal value of the motor.

3. The inverter control device of claim 1, wherein the first estimation unit comprises:
    a second determination unit configured to determine an output power using the output voltage and an output current of the inverter;
    a third determination unit configured to determine a load torque using the output power and an output frequency of the inverter;
    a second estimation unit configured to estimate a slip frequency using the load torque and a rated slip frequency and a rated torque of the inverter; and
    a third estimation unit configured to estimate the rotation speed of the motor using a difference between the slip frequency estimated by the second estimation unit and the output frequency of the inverter.

4. The inverter control device of claim 3, wherein the first estimation unit further comprises a low pass filter (LPF) configured to perform low-pass-filtering on the slip frequency estimated by the second estimation unit.

5. The inverter control device of claim 1, wherein the first determination unit comprises:
    a fourth determination unit configured to determine a necessary energy from the energy of the direct current terminal capacitor of the inverter and the direct current terminal energy reference;
    a fifth determination unit configured to determine a power reference from the necessary energy;
    a sixth determination unit configured to determine a torque reference using the power reference and the rotation speed of the motor; and
    a seventh determination unit configured to determine the slip frequency reference using a torque constant in the torque reference.

6. The inverter control device of claim 5, wherein the fifth determination unit includes a proportional controller.

7. The inverter control device of claim 5, wherein the torque constant is determined using a rated torque of the motor and a rated slip frequency of the motor.

8. The inverter control device of claim 1, wherein the generation unit determines a voltage reference from the frequency reference and provides the voltage reference to the inverter.

9. The inverter control device of claim 1, further comprising a control unit configured to provide an operation flag to the first determination unit when the direct current terminal voltage of the inverter is the certain level or less.

10. An inverter control method comprising:
    estimating a rotation speed of a motor;
    determining a slip frequency reference using an energy of a direct current terminal capacitor of an inverter, which provides an output voltage to the motor, and a direct current terminal energy reference when a direct current terminal voltage of the inverter is a certain level or less; and providing a frequency reference determined by adding the rotation speed of the motor and the slip frequency reference to the inverter.

11. The inverter control method of claim 10, wherein the estimating of the rotation speed of the motor comprises:
   determining an output power using the output voltage and an output current of the inverter;
   determining a load torque using the output power and an output frequency of the inverter;
   estimating a slip frequency using the load torque and a rated slip frequency and a rated torque of the inverter; and
   estimating the rotation speed of the motor using a difference between the estimated slip frequency and the output frequency of the inverter.

12. The inverter control method of claim 10, wherein the determining of the slip frequency reference comprises:
   determining a necessary energy from the energy of the direct current terminal capacitor of the inverter and the direct current terminal energy reference;
   determining a power reference from the necessary energy;
   determining a torque reference using the power reference and the rotation speed of the motor; and
   determining the slip frequency reference using a torque constant in the torque reference.

* * * * *